Feb. 8, 1938. A. G. H. VANDERPOEL Re. 20,651

AUTOMATIC DECELERATION CONTROL DEVICE

Original Filed April 10, 1934

Inventor:
Albert G.H. Vanderpoel.

Attorney.

Reissued Feb. 8, 1938

Re. 20,651

UNITED STATES PATENT OFFICE 20,651

AUTOMATIC DECELERATION CONTROL DEVICE

Albert G. H. Vanderpoel, Wilmar, Calif., assignor of one-third to James O'Laverty and one-third to David E. Seward, both of Los Angeles, Calif.

Original No. 2,017,878, dated October 22, 1935, Serial No. 719,888, April 10, 1934. Application for reissue November 10, 1936, Serial No. 110,135

19 Claims. (Cl. 123—97)

My invention relates generally to carbureters and more particularly to an automatic deceleration control device for the conventional forms of carbureters, in order to materially increase the efficiency of the carbureter in controlling the flow of fuel vapor to the intake manifold of the internal combustion engine with which the carbureter is associated.

The principal objects of my invention are, to provide the conventional carbureter with a secondary valve that cooperates with the main valve in controlling the flow of fuel vapor through the carbureter and further, to provide an attachment wherein the secondary valve will be automatically closed to cut off the flow of fuel vapor through the carbureter immediately following the decelerating action of the main valve of the carbureter, thereby preventing the vacuum that is built up in the intake manifold from sucking practically raw gas through the carbureter into the intake manifold and the engine cylinders, which action produces an objectionable discharge of smoke and noxious gases from the exhaust manifold of the engine.

A further object of my invention is, to provide a deceleration control device that is relatively simple in construction, inexpensive of manufacture and which is entirely automatic in operation.

With the foregoing and other objects in view my invention consists in certain novel features of construction and arrangements of parts that will be hereinafter more fully described and claimed and illustrated in the accompanying drawing in which:

Figure 1:
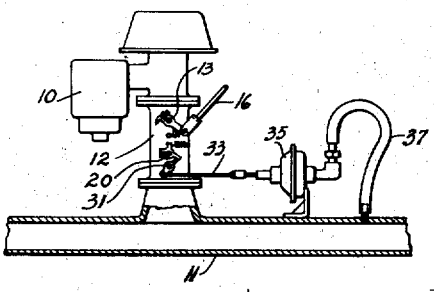
Fig. 1 is an elevational view of a carbureter with which my improved deceleration control device is associated and showing the same connected to the intake manifold of an internal combustion engine.

Referring by numerals to the accompanying drawing which illustrates a preferred embodiment of my invention, 10 designates a conventional carbureter, 11 the intake manifold of the engine with which the carbureter is associated and 12 a tubular member that connects the carbureter with the manifold.

Extending transversely through the upper portion of the tubular member 12, is a shaft 13 and mounted thereon within tubular member 12, is a disc valve 14.

Mounted on the forward end of shaft 13, is a short crank arm 15, to the outer end of which is pivoted the end of a rod 16 that is actuated by the conventional accelerator pedal or lever.

Figure 5:
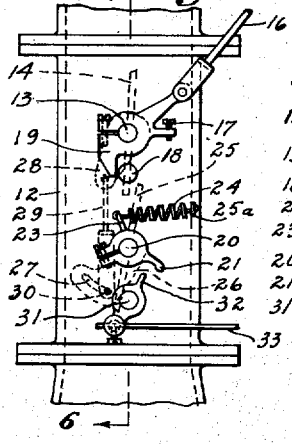
Fig. 5 is an elevational view of the device and showing both valves in full open position.
Figure 6:
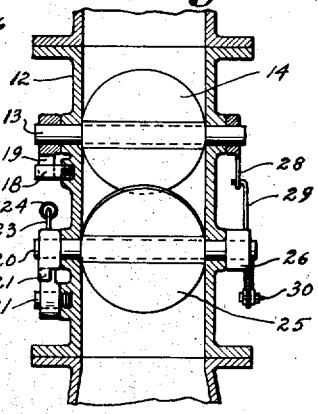
Fig. 6 is a vertical section taken on line 6—6 of Fig. 5.

Arm 15 carries a screw 17 that is adapted to engage a stop lug 18 that is formed on member 12 to limit the closing movement of the valve 14 and the opening movement of said valve is limited by a lug 19 that engages stop lug 18 when valve 14 is swung into full open position as illustrated in Fig. 5.

Figure 2:
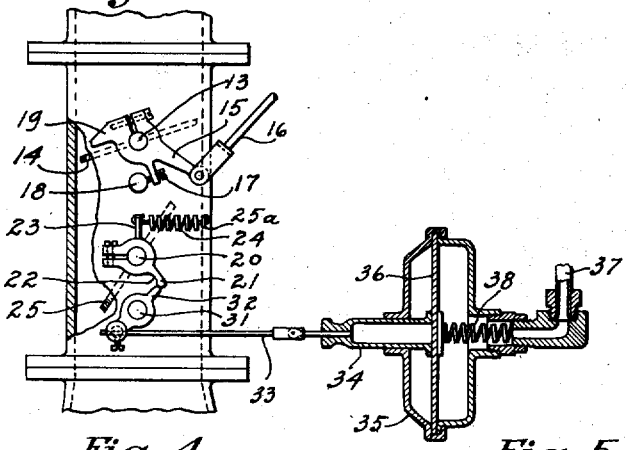
Fig. 2 is an enlarged front elevational view of the carbureter and the deceleration control and showing the vacuum actuated means utilized for controlling the operation of the secondary valve of the carbureter.

Screw 17 is adjusted so that when it engages stop 18, valve 14 is slightly open, as illustrated in Fig. 2, so as to permit sufficient gaseous fuel to pass from the carbureter to the intake manifold and permit the engine to run at idle speed.

The construction just described is conventional.

Extending transversely through the lower portion of tubular member 12, is a shaft 20 and secured to the forward end thereof, is a short arm 21 provided in its underface with a notch 22.

Projecting upwardly from arm 21, is a short arm 23, to which is connected one end of a retractile spring 24 and the other end thereof being secured to a pin or stud 25a that projects from member 12.

Figure 4:
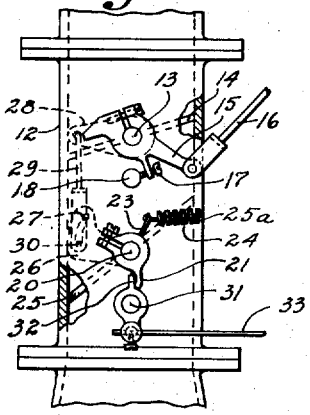
Fig. 4 is an elevational view of the device and showing the secondary valve in full closed position.

Carried by shaft 20 within tubular member 12, is a disc valve 25, which when occupying a position of approximately forty-five degrees relative to a horizontal plane, completely closes the passageway through member 12 (see Fig. 4).

Carried by the rear end of shaft 20, is a short arm 26, in the outer portion of which is formed a slot 27. Carried by the rear end of shaft 13, is a short arm 28 and pivotally connected to the outer end of said arm, is the upper end of a link 29, the lower portion of which is bifurcated and carries a pin 30 that extends through slot 27. A retractile spring 30a connects the arms 26 and 28 and said spring normally tends to draw said arms toward each other (see Fig. 3).

Mounted on a stud 31 that projects from member 12, just below shaft 20, is a finger 32, the upper end of which normally bears against the lower portion of the side of arm 21 just below the notch 22.

Connected to the lower end of finger 32, below the stud 31, is one end of a rod 33, the opposite end of which is connected to a plunger 34 that is mounted for sliding movement through one wall of a housing 35.

Arranged within the housing 35, is a flexible diaphragm 36 and the inner end of plunger 34 is connected to the center of this diaphragm.

The chamber within the housing on the opposite side of the diaphragm is connected by suitably arranged tubular members 37 to the intake manifold 11 and arranged within the housing on the opposite side of the diaphragm from the plunger 34, is an expansive spring 38. The expansive force of spring 38 is greater than the tension of spring 24 so that the finger 32 is normally held in the full line position of Fig. 2 to lock the arm 21 against valve closing movement.

Figure 3:
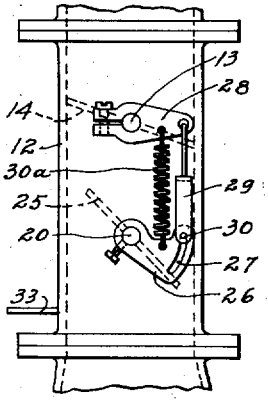
Fig. 3 is a rear elevational view of the deceleration control device.

Under normal conditions or while the engine is running at idle speed, the operating parts of the carbureter and the attachment thereto occupy the positions as illustrated in Figs. 1, 2 and 3, with the valves 14 and 25 opened to such a degree as to permit sufficient gaseous fuel to pass from the carbureter into the engine cylinders to enable the engine to idle.

The usual spring associated with the accelerator rod 16, holds the screw 17 against stop 18 and spring 24 holds the end of arm 21 against finger 32.

When the foot pedal or hand lever is actuated to pull accelerator rod 16, arm 15 is swung so as to impart rotary movement to shaft 13 and valve 14 carried by said shaft will be correspondingly swung into open position to permit an increase in flow of gaseous fuel to the engine and thereby increase the speed thereof.

During this acceleration, arm 28 will swing downward and pin 30, carried by the lower end of link 29 will move downward through slot 27 in arm 26, which arm is held against swinging movement by the engagement of finger 32 against the lower end of arm 21.

If acceleration is continued until lug 19 on arm 15 engages stop 18, the pin 30 in the lower end of link 29 will engage the arm 26 at the lower end of slot 27 and swing the latter downward and consequently swinging secondary valve 25 into full open position, as illustrated in Fig. 5, and thus a maximum volume of gaseous fuel is permitted to flow through the carbureter attachment to the engine so that the same runs at high speed.

My improved attachment is designed to function so as to entirely cut off the flow of gaseous fuel to the intake manifold of the engine when deceleration takes place and particularly after the engine has been operating at high and intermediate speeds. When deceleration takes place accelerator rod 16 moves downward, thereby permitting valve 14 to return to its normal position under the influence of the spring associated with the accelerator rod and as this movement takes place the pin 30 at the lower end of link 29 moves upward through slot 27 without imparting movement to arm 26 and secondary valve 25.

Following sudden deceleration and the cutting off of the gaseous fuel to the intake manifold creates a substantial degree of vacuum within said manifold, which vacuum under present conditions or with the present types of carbureters draws raw gasoline through the carbureter and intake manifold and as this raw gasoline is ignited in the engine cylinders it creates a substantial volume of smoke and noxious gases that are discharged through the exhaust pipe. This result is very undesirable, particularly in the heavier types of vehicles used as motor buses.

When deceleration takes place where my improved carbureter attachment is used, the vacuum produced in the intake manifold will act on flexible diaphragm 36 to draw the same toward the tubular connections leading to the intake manifold, which movement overcomes the resistance offered by spring 38 and the plunger 34 moves into the housing 35 and rod 33 swings arm 32 upon its axis, thereby moving the upper end of said arm into the notch 22 and permitting arm 21 and shaft 20 to swing under the influence of retractile spring 24, so that secondary valve 25 will be shifted into full closed position as illustrated in Fig. 4, thereby completely cutting off the flow of gaseous fuel through the carbureter to the intake manifold.

As soon as the vacuum prevailing within the intake manifold is broken and normal pressures prevail in said manifold, diaphragm 36 will return to its normal position under the influence of spring 38, thereby swinging arm 32 on its axis and the upper end of said arm engaging the lower end of arm 21 will move the same and shaft 20 so as to return secondary valve 25 to its normal partly open position as illustrated in Fig. 2.

Summarizing the description of the operation for the purpose of clarity, it will be understood that when the engine is operating at normal idling speed, the pressure, or more accurately the depression, in the intake manifold 11 is the normal idling pressure or depression for the engine. During such operation as was pointed out above the various elements forming the combination contemplated by this invention occupy the relative position shown in Fig. 2, and since the vacuum in the intake manifold at normal idling depression is insufficient to retract the diaphragm 36 against the action of the spring 38, this spring is effective to hold the finger 32 in the position shown in Fig. 2. In other words, it prevents the spring 25*a* swinging the arm 21 to close the secondary valve 25.

When the throttle valve 14 is opened to accelerate the engine, the arm 28 (see Fig. 3) which is on the end of the shaft 13 opposite the throttle actuating lever 15, swings downwardly and advances the pin 30 downwardly in the slot 27. After the pin 30 has reached the bottom of slot 27, further opening movement of throttle valve or the main valve will, as was pointed out above, open the secondary valve 25, beyond the position of Fig. 2, finally bringing it to the position shown in Fig. 5 when the throttle valve 14 is wide open.

If at any intermediate point between the throttle valve position shown in Fig. 2 and the throttle valve position shown in Fig. 5, the accelerator is released to permit the return of the throttle valve to its "closed" or idling position, it will be seen that the engine will continue to be driven by its own momentum, or the momentum of the vehicle which it normally drives. The ensuing operation of the engine on momentum has been referred to herein as deceleration, but it will be understood that there may be circumstances such as for example an automobile traveling down hill, in which the term deceleration does not accurately apply. However, so far as the operation of the device contemplated by this invention is concerned, the mere operation of the engine on momentum with the throttle valve closed to idling position will effect the contemplated results, and for that reason, the term deceleration as used herein is meant to include any operation of the engine on momentum with the throttle valve closed.

Immediately as the throttle valve 14 is "closed" to idling position, the depression or vacuum in the intake manifold 11 raises to an abnormally high point, such vacuum being communicated through the tubular member 37 to the diaphragm 36, is effective to retract the diaphragm against the action of the spring 38, thereby swinging the finger 32 to the position shown in Fig. 4, such action permitting the spring 25a to swing the arm 21 and close the secondary valve 25. It will thus be seen that the closure of the secondary valve 25 is controlled first by the movement of the throttle valve 14 to idling position and second by the action of the ensuing vacuum on the diaphragm, which actuates the finger 32 that controls the valve closing movement of the arm 21 by the spring 25a.

As an engine operating with the parts positioned as shown in Fig. 4 decelerates or slows down, the point is finally reached at which the engine is running at normal idling speed and at which normal idling depression or, as mentioned above, "normal pressures prevail in the manifold 11."

It might be pointed out here that while a pressure does actually exist in the intake manifold so far as the absolute pressure scale is concerned, such pressures, as exist there, are usually sub-atmospheric, and for that reason are more aptly classed as depression or what has previously been referred to as vacuum.

At this stage of the operation, when normal idling depression is reached, in the manifold 11 such depression or vacuum applied to the diaphragm 36, through the tubular member 37, is insufficient to overcome the compressive action of the spring 38, and this spring now becomes effective to advance the plunger member 34 which through the rod 33 swings the finger 32 back to the full line position shown in Fig. 2, thus opening the secondary valve 25.

Since it is frequently desirable to accelerate the engine again after the throttle valve has been closed to idling position but before the engine itself has decelerated to the point at which the depression in the manifold 11 will permit spring 38 to open the secondary valve in the manner just described above, it is important that means be provided for opening the secondary valve 25, shown in closed position in Fig. 4, through the medium of the throttle valve itself or the throttle valve actuating means. Furthermore, it is important that such means operate independently of the finger 32 insofar as this opening movement of valve 25 is concerned. In the present form of my invention this is accomplished through the medium of the link member 29 and the slotted arm 26.

It will be observed from the dotted line positions of link 29 and arm 26 in Fig. 4, that when both the valves 14 and 25 are in their respective closed positions the pin 30 occupies the bottom portion of the slot 27 in arm 26. With the parts thus arranged it will be seen that any movement of the throttle valve 14 from its idling position as shown in Fig. 4 toward an open position will be attended by a downward swinging movement of the arm 28 which in turn will depress the rod 29 and effect the corresponding opening movement of the secondary valve 25.

From the foregoing discussion it will be seen that the opening movement of the secondary valve 25 is effected either by the finger 23, movement of which is controlled by the vacuum in intake manifold 11, or is effected by the independent opening movement of the throttle valve 14.

The closing movement of valve 25 is effected by the abnormally high depression that obtains in the manifold when the throttle is closed to idling position and the engine is running above normal idling speed.

Inasmuch as my improved carbureter attachment is effective in preventing raw gasoline from being drawn into the intake manifold and the cylinders of the engine immediately subsequent to deceleration action, the development of heavy smoke, noxious gases and fumes is prevented and a material saving of gasoline is effected, which means greater mileage for the equipped vehicle during operation.

While I have shown the secondary valve arranged to cooperate with the main carbureter valve by mechanical means, it will be understood that the secondary valve may be arranged to cooperate with the main valve by suitable electrically operated means or by means actuated by gas or air pressure.

Thus it will be seen that I have provided a deceleration control device that is relatively simple in construction, inexpensive of manufacture, practically automatic in operation and which is very effective in performing the functions for which it is intended.

It will be understood that minor changes in the size, form and construction of the various parts of my improved deceleration control device may be made and substituted for those herein shown and described without departing from the spirit of my invention, the scope of which is set forth in the appended claims.

I claim:

1. The combination with a carbureter and intake manifold, of a gaseous fuel conduit leading from the carbureter to the intake manifold, a valve arranged for operation within said conduit, a spring connected to said valve and normally tending to close the same, means for normally holding said valve from closing, and means actuated by the vacuum produced within the intake manifold when the flow of gaseous fuel thereto is decelerated, for releasing said valve holding means to permit said valve to close.

2. The combination with a carbureter and an intake manifold, of a gaseous fuel conduit connecting said carbureter and manifold, a pair of valves arranged for operation in said conduit for controlling the flow of gaseous fuel therethrough, an operating rod connected to one of said valves, operating connections between said valves whereby opening movement imparted to one valve by the actuating rod connected thereto, imparts opening movement to the other valve, means actuated by the vacuum produced in the intake manifold when the flow of gaseous fuel therethrough is decelerated for releasing one of said valves and permitting the same to close, and means for closing said last mentioned valve when it is released by said vacuum actuated means.

3. The combination with a carbureter and an intake manifold, of a gaseous fuel conduit connecting said carbureter and manifold, a pair of valves arranged for operation in said conduit for controlling the flow of gaseous fuel therethrough, an operating rod connected to one of said valves, operating connections between said valves whereby opening movement imparted to one valve by the actuating rod connected thereto, imparts opening movement to the other valve, releasable holding means actuated by the vacuum produced in the intake manifold when the flow of gaseous fuel thereto is decelerated for permitting the other one of said valves to move into full closed position, and means normally biasing said last mentioned valve toward closed position.

4. In combination with the carbureter and intake manifold of an internal combustion engine to which said carbureter is connected: a throttle valve associated with the carbureter; a secondary valve in the passage between the carbureter and the intake manifold; depression actuated means communicating with the intake manifold; connective means between said depression actuated means and said secondary valve normally operable to open said secondary valve and operable upon suction responsive movement of said depression actuated means to allow said secondary valve to close; connective means between said throttle valve and said secondary valve operable to open said secondary valve when said throttle is opened and to allow said secondary valve to close when said throttle valve is closed; and means for closing said secondary valve.

5. In combination with the carbureter and intake manifold of an internal combustion engine to which said carbureter is connected: a throttle valve associated with the carbureter; a secondary valve in the passage between the carbureter and the intake manifold; depression actuated means communicating with the intake manifold; connective means between said depression actuated means and said secondary valve including a member acting on said secondary valve in the direction of opening only and operable to open said secondary valve and to allow said secondary valve to close; connective means between said throttle valve and said secondary valve operable to open said secondary valve when said throttle valve is opened and to allow said secondary valve to close when said throttle valve is closed; and yieldable means for closing said secondary valve.

6. In combination with the suction passage of a carbureter system having a throttle valve and an auxiliary valve therein; yieldable means for closing said auxiliary valve; releasable means holding said auxiliary valve open against the action of said closing means; and suction responsive means communicating with said suction passage and operable by an abnormally high depression from said suction passage to release said holding means.

7. In combination with a carbureter and an intake manifold: a gaseous fuel conduit connecting said carbureter and manifold; a pair of valves arranged for operation in said conduit for controlling the flow of gaseous fuel therethrough; an operating rod connected to one of said valves; operating connections between said valves whereby opening movement imparted to the one valve by said operating rod, imparts opening movement to the other valve; yieldable means biasing said last mentioned valve toward closed position; releasable stop means normally holding said last mentioned valve in open position; and suction responsive means communicating with said manifold for moving said stop means to release said last mentioned valve when the depression in said manifold exceeds a predetermined limit.

8. In combination with a carbureter and intake manifold: a gaseous fuel duct leading from the carbureter to the manifold; a valve located in said duct adapted to cut off the flow of gaseous fuel from the carbureter to the intake manifold when closed; yieldable means biasing said valve toward closed position; releasable stop means normally acting to hold said valve in open position; and suction responsive means communicating with said intake manifold operable to move said stop means and release said valve when the depression in said manifold exceeds a predetermined limit.

9. In combination with a carbureter and an intake manifold: a gaseous fuel conduit connecting said carbureter and manifold; a first valve and a second valve arranged for operation in said conduit for controlling the flow of gaseous fuel therethrough; an operating rod connected to said first valve; operating connections between said valves, whereby opening movement imparted to the first valve by said rod imparts opening movement to the second valve; yieldable means biasing said second valve toward closed position; releasable stop means normally holding said second valve in open position; suction responsive means communicating with said manifold for moving said stop means to release said second valve when the depression in said manifold exceeds a predetermined limit; and yieldable means operating to open said second valve when said depression falls below said predetermined limit.

10. In combination with a carbureter and intake manifold: a gaseous fuel duct leading from the carbureter to the manifold; a valve located in said duct adapted to cut off the flow of gaseous fuel from the carbureter to the intake manifold when closed; yieldable means biasing said valve toward closed position; releasable stop means normally acting to hold said valve in open position; suction responsive means communicating with said intake manifold operable to move said stop means and release said valve when the depression in said manifold exceeds a predetermined limit; and yieldable means operating to open said valve when said depression falls below said predetermined limit.

11. The combination with a carbureter having a main valve for controlling the flow of gaseous fuel through said carbureter, of a secondary valve located in the outlet from the carbureter, operating connections between said valves whereby opening movement imparted to the main valve imparts opening movement to said secondary valve, releasable means normally holding the secondary valve from closing, suction actuated means adapted to be actuated by the suction applied to the carbureter outlet and operating to release said holding means, and means for imparting full closing movement to the secondary valve when the holding means is released.

12. The combination with a carbureter and an intake manifold, of a tubular connection between said carbureter and intake manifold, a main valve located in said tubular connection for controlling the flow of gaseous fuel therethrough, a normally open secondary valve arranged for operation in said tubular connection, operating connections between said valves acting to open the secondary valve when the main valve is opened, releasable means normally holding the secondary valve from closing, separate means operative to close the secondary valve when said holding means is released, and separate means actuated by suction from the intake manifold to release said holding means.

13. The combination with a carbureter and an intake manifold, of a gaseous fuel duct leading from the carbureter to the manifold, a valve located in said duct, releasable means normally holding said valve from closing, separate means operative to close said valve when the holding means is released and thereby to cut off flow of fuel from the carbureter to the intake manifold, and separate means, actuated by the vacuum produced in the intake manifold when the flow of gaseous fuel therethrough is decelerated, to release said holding means.

14. The combination with a carbureter and an engine intake manifold, of a gaseous fuel duct leading from the carbureter to the manifold, a valve located in said duct and adapted when closed to cut off the flow of gaseous fuel from the carbureter to the manifold, releasable means normally holding said valve from closing, means operative to close said valve when the holding means is released, and means actuated by the abnormally high manifold vacuum produced in the intake manifold when the engine is running by momentum and flow of gaseous fuel to the manifold is restricted, to release said holding means.

15. The combination with a carbureter and an engine intake manifold, of a tubular connection between said carbureter and intake manifold, a main valve located in said tubular connection for controlling the flow of gaseous fuel therethrough, a normally open secondary valve arranged for operation in said tubular connection, operating connections between said valves acting to open the secondary valve when the main valve is opened, releasable means normally holding the secondary valve from closing, separate means operative to close the secondary valve when said holding means is released, and means, actuated by virtue of the engine operating at more than idling speed with the main valve closed to idling, to release said holding means.

16. The combination with a carbureter and an engine intake manifold, of a gaseous fuel duct leading from the carbureter to the manifold, a valve located in said duct, releasable means normally holding said valve from closing, separate means operative to close said valve when the holding means is released and thereby to cut off flow of fuel from the carbureter to the intake manifold, and means, actuated by virtue of the engine operating at relatively high speed when the flow of gaseous fuel to the intake is restricted, to release said holding means.

17. The combination with a carbureter and an intake manifold, of a tubular connection between said carbureter and intake manifold, a main valve located in said tubular connection for controlling the flow of gaseous fuel therethrough, a normally open secondary valve arranged for operation in said tubular connection, operating connections between said valves acting to open the secondary valve when the main valve is opened, movable stop means adapted by movement in one direction to open the secondary valve and by movement in the other direction to allow said valve to close, means operative to close the secondary valve when the stop is moved to allow said valve to close, and means for moving said stop in said first and second mentioned directions, respectively, by virtue of suction in the intake manifold being less or more than a predetermined value.

18. The combination with a carbureter and an intake manifold, of a gaseous fuel duct leading from the carbureter to the manifold, a valve located in said duct, movable stop means adapted by movement in one direction to open said valve and by movement in the other direction to allow said valve to close, means operative to close said valve when the stop is moved to allow the valve to close, and thereby to completely cut off flow of fuel from the carbureter to the intake manifold, and means for moving said stop in said first and second mentioned directions, respectively, by virtue of suction in the intake manifold being less or more than a predetermined value.

19. The combination with a carburetor and an engine intake manifold, of a gaseous fuel duct leading from the carburetor to the manifold, a valve located in said duct and adapted when closed to cut off the flow of gaseous fuel from the carburetor to the manifold, movable stop means adapted by movement in one direction to open said valve and by movement in the other direction to allow said valve to close, means operative to close said valve when the stop is moved to allow the valve to close, and thereby to cut completely off flow of fuel from the carburetor to the intake manifold, and means for moving said stop in said first and second mentioned directions, respectively, including means, actuated by virtue of the suction in the intake manifold being greater than that obtaining at normal idling operation, to move said stop means in said second direction.

ALBERT G. H. VANDERPOEL.